United States Patent
Meeks

(10) Patent No.: US 11,160,205 B2
(45) Date of Patent: Nov. 2, 2021

(54) LAWNMOWER MULCH PLUG RAMPS TO IMPROVE MULCHING PERFORMANCE

(71) Applicant: Honda Motor Co., Ltd., Tokyo (JP)

(72) Inventor: Christopher D. Meeks, Greensboro, NC (US)

(73) Assignee: HONDA MOTOR CO., LTD., Tokyo (JP)

(*) Notice: Subject to any disclaimer, the term of this patent is extended or adjusted under 35 U.S.C. 154(b) by 719 days.

(21) Appl. No.: 15/935,722

(22) Filed: Mar. 26, 2018

(65) Prior Publication Data

US 2019/0289781 A1 Sep. 26, 2019

(51) Int. Cl.
| | |
|---|---|
| *A01D 34/00* | (2006.01) |
| *A01D 42/00* | (2006.01) |
| *A01D 43/08* | (2006.01) |
| *A01D 34/81* | (2006.01) |
| *A01D 34/73* | (2006.01) |
| *A01D 34/685* | (2006.01) |

(52) U.S. Cl.
CPC ........... *A01D 34/005* (2013.01); *A01D 34/81* (2013.01); *A01D 42/005* (2013.01); *A01D 43/088* (2013.01); *A01D 34/685* (2013.01); *A01D 34/733* (2013.01)

(58) Field of Classification Search
CPC .... A01D 34/81; A01D 34/005; A01D 42/005; A01D 2101/00; A01D 43/08
See application file for complete search history.

(56) References Cited

U.S. PATENT DOCUMENTS

| | | | | |
|---|---|---|---|---|
| 2,983,096 | A | * 5/1961 | Phelps | A01D 34/71 56/255 |
| 3,118,267 | A | * 1/1964 | Shaw | A01D 34/71 56/17.5 |
| 3,919,832 | A | * 11/1975 | Christopherson | A01D 34/71 56/320.2 |
| 4,189,903 | A | 2/1980 | Jackson et al. | |
| 4,205,512 | A | 6/1980 | Thorud | |
| 4,312,174 | A | * 1/1982 | Vanderhoef | A01D 34/71 56/255 |
| 4,435,949 | A | * 3/1984 | Heismann | A01D 42/005 56/17.5 |
| 4,864,808 | A | 9/1989 | Weber | |
| 4,951,449 | A | * 8/1990 | Thorud | A01D 42/005 56/2 |
| 5,090,183 | A | 2/1992 | Thorud et al. | |

(Continued)

FOREIGN PATENT DOCUMENTS

JP H05103524 A 4/1993

*Primary Examiner* — Thomas B Will
*Assistant Examiner* — Joan D Misa
(74) *Attorney, Agent, or Firm* — Arent Fox LLP

(57) ABSTRACT

A lawnmower with a mulch plug with a plurality ramps for deflecting lawn clippings out of a cutting deck with more than one depth planes. The mulch plug is configured to attach to the lawnmower by one or more attachment points to block a collector opening of the lawnmower. The plurality of ramps comprises a first ramp and a second ramp on the lower plane of the cutting deck extending downward from the mulch plug. The second ramp is positioned further in the cutting rotation of the lawnmower on a trailing edge of the mulch plug. The secure attachment of the mulch plug with a plurality of ramps provides a more even distribution of grass clippings.

14 Claims, 8 Drawing Sheets

(56) References Cited

U.S. PATENT DOCUMENTS

| | | | | |
|---|---|---|---|---|
| 5,191,756 A * | 3/1993 | Kuhn | A01D 34/005 | |
| | | | 56/13.4 | |
| 5,205,112 A | 4/1993 | Tillotson et al. | | |
| 5,212,938 A * | 5/1993 | Zenner | A01D 34/005 | |
| | | | 56/17.5 | |
| 5,267,429 A * | 12/1993 | Kettler | A01D 34/005 | |
| | | | 56/295 | |
| 5,284,007 A | 2/1994 | Poe et al. | | |
| 5,488,821 A * | 2/1996 | McCunn | A01D 34/005 | |
| | | | 56/320.2 | |
| 5,765,346 A * | 6/1998 | Benter | A01D 34/005 | |
| | | | 56/2 | |
| 6,085,508 A * | 7/2000 | Miatt | A01D 34/74 | |
| | | | 56/17.1 | |
| 6,735,932 B2 * | 5/2004 | Osborne | A01D 42/005 | |
| | | | 56/17.5 | |
| 6,990,793 B2 * | 1/2006 | Osborne | A01D 42/005 | |
| | | | 56/320.1 | |
| 7,146,791 B2 | 12/2006 | Benway et al. | | |
| 7,171,799 B2 * | 2/2007 | Takeishi | A01D 34/81 | |
| | | | 56/320.1 | |
| 7,571,593 B2 | 8/2009 | Kucera et al. | | |
| 8,015,785 B2 * | 9/2011 | Walker | A01D 34/005 | |
| | | | 56/320.2 | |
| 8,015,786 B2 * | 9/2011 | Minami | A01D 42/005 | |
| | | | 56/320.2 | |
| 8,127,522 B2 | 3/2012 | Campbell | | |
| 8,857,145 B2 * | 10/2014 | Volovsek | A01D 43/0636 | |
| | | | 56/320.2 | |
| 2008/0105445 A1 * | 5/2008 | Dayton | A01D 42/00 | |
| | | | 172/105 | |
| 2012/0233975 A1 | 9/2012 | Coussins | | |
| 2014/0299089 A1 * | 10/2014 | Koenen | H02J 7/0027 | |
| | | | 123/179.28 | |

* cited by examiner

LAWNMOWER MULCH PLUG RAMPS TO IMPROVE MULCHING PERFORMANCE

BACKGROUND

Conventional mulch plugs within a lawnmower may allow lawn clippings to accumulate in a cutting deck and cause lawn clippings to be unevenly distributed to the ground. As the lawn clippings are accumulating, a cutting volume of the cutting deck may be decreased and the pressure in the cutting deck increased. The decrease in cutting volume and increased pressure may cause the uneven distribution of the lawn clippings and lead to clumped or striped lawn clippings on the ground and uneven absorption of nutrients by the underlying mowed lawn.

Accordingly, there is a need for a mulch plug with ramps securely attached to the cutting deck for deflecting grass out of the cutting deck. The removal of a portion of the lawn clippings that were deflected out of the cutting deck after contacting the ramps of the mulch plug may reduce the volume of lawn clippings forced out the cutting deck in one location. As a result, the lawn clippings may be evenly distributed to the ground. The even distribution of lawn clippings may help to prevent the clumping of lawn clippings or stripes of lawn clippings in the path of the rear wheels.

SUMMARY

In accordance with one embodiment, a lawnmower capable of mulching lawn clippings, comprises a cutting deck with two or more depth planes supported by a pair of front and rear wheels. The lawnmower has at least one cutting blade and a collector opening. A mulch plug with a plurality of ramps is configured to snap-fit to a lower plane of the cutting deck and interference-fit to an upper plane of the cutting deck to block the collector opening. The plurality of ramps comprises a first ramp on the lower plane of the cutting deck, which extends downward from the mulch plug and a second ramp positioned further in the rotation of the cutting blade from the first ramp on a trailing edge of the mulch plug for deflecting lawn clippings out of the cutting deck.

In accordance with another embodiment, a lawnmower capable of mulching lawn clippings, comprises a cutting deck with two or more depth planes supported by a pair of front and rear wheels. The lawnmower utilizes a swing blade system. A mulch plug with a plurality of ramps is configured to attach to a lower plane and an upper plane of the cutting deck to block the collector opening. The plurality of ramps comprises a first ramp on the lower plane of the cutting deck, which extends downward from the mulch plug and a second ramp positioned further in the rotation of the cutting blades from the first ramp on a trailing edge of the mulch plug for deflecting lawn clippings out of the cutting deck.

In accordance with yet another embodiment, a lawnmower capable of mulching lawn clippings, comprises a cutting deck with two or more depth planes supported by a pair of front and rear wheels. The lawnmower utilizes a cutting blade system. A mulch plug with a plurality of ramps is configured to attach to a lower plane of the cutting deck, an upper plane of the cutting deck and snap-fit over a rear axle to block the collector opening. The plurality of ramps comprises a first ramp on the lower plane of the cutting deck, which extends downward from the mulch plug and a second ramp positioned further in the rotation of the cutting blade from the first ramp on a trailing edge of the mulch plug for deflecting lawn clippings out of the cutting deck.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The present disclosure is directed to a mulch plug for a lawnmower. The mulch plug may include a plug body configured to cover a collector opening of the lawnmower, with improved points for attachment of the plug body to the lawnmower. The attachment points of the plug body described herein to the lawnmower may be configured to snap-fit to the lower dome of the lawnmower, which may eliminate built-in ledges for attachment to the lower dome, or alternatively, support in the lower dome area of the lawnmower itself. In addition, the mulch plug body may be configured to interference-fit to the upper dome of the lawnmower, such as at an angle. In addition, the mulch plug body may contain one or more tabs extending from the plug body and positioned and configured to engage the edge of a rear discharge door of the lawnmower. The mulch plug may further contain a mating surface configured to fit over a rear axle of the lawnmower.

The mulch plug of the present disclosure may offer several advantages over conventional mulch plugs. The snap-fit point(s) of attachment may make installation and removal of the mulch plug easier for the operator. In addition, the attachment points may fit more securely to the lawnmower. This minimizes slipping of the installed mulch plug during lawnmower operation, thus avoiding clogging and/or locking of the wheels with mulch and/or clippings, in turn improving machine life. The secured mounting of the installed mulch plug may provide consistent performance and an even distribution of the mulch over the lawn. Other advantages may exist and will become apparent from the disclosure provided below.

Embodiments are hereinafter described in detail in connection with the views and examples of FIGS. 1-8, wherein like numbers indicate the same or corresponding elements throughout the views. It should be understood that the description and drawings herein are merely illustrative and that various modifications and changes may be made in the structures disclosed without departing from the concepts of the present disclosure.

Figure 1:
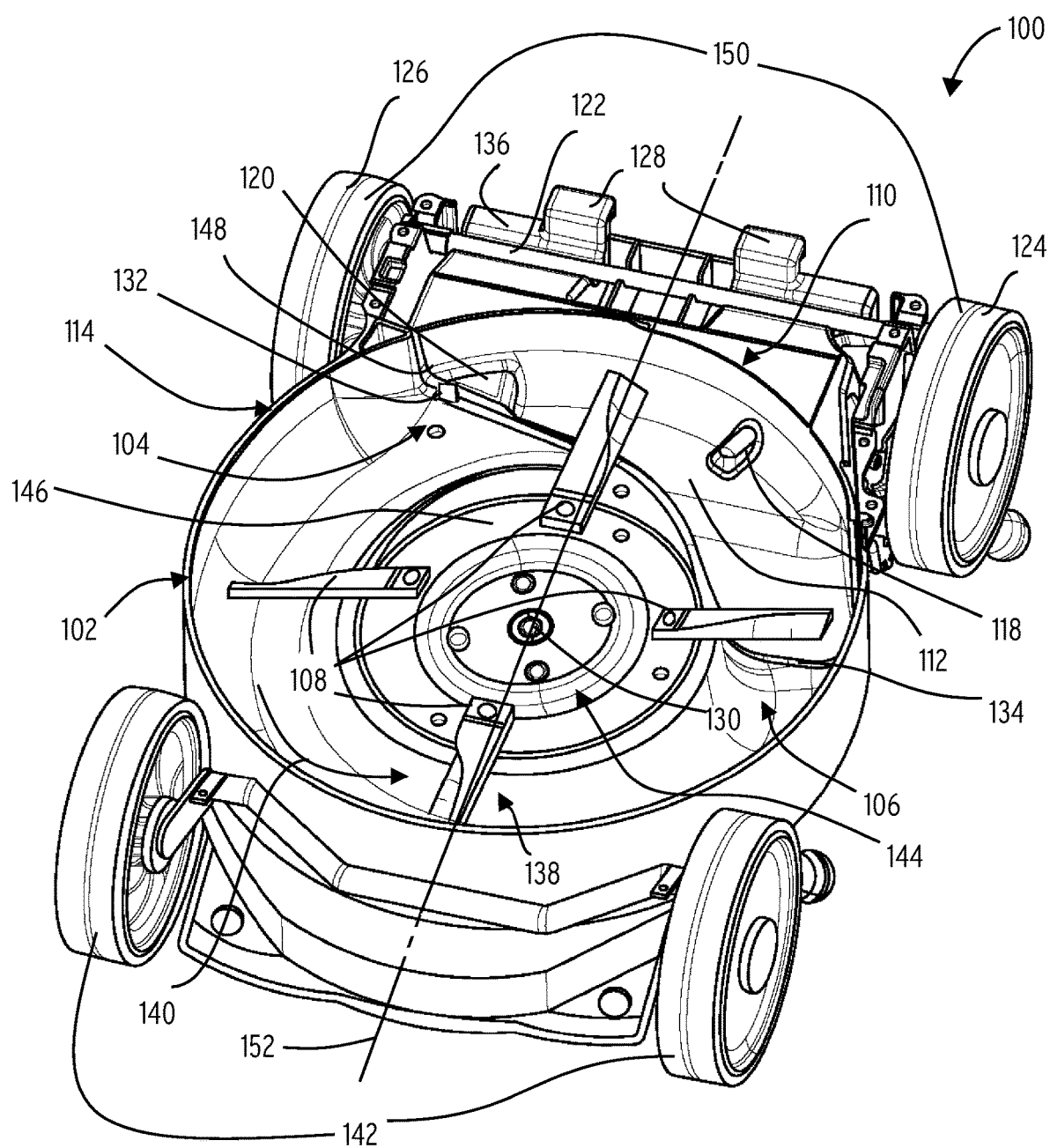
FIG. 1 is a front bottom perspective view of an exemplary lawnmower with an illustrative mulch plug installed in accordance with one aspect of the present disclosure.

FIG. 1 is a front bottom perspective view of a lawnmower 100. In the exemplary embodiment, the lawnmower 100 may include a cutting deck 102 with one or more depth planes, including at least a lower plane 104 and an upper plane 106. The cutting deck 102 may be supported by a pair of front wheels 142 and a pair of rear wheels 150. Additionally, the lawnmower 100 may include at least one cutting blade 108.

A mulch plug 112 may be configured to block a collector opening 110 in the cutting deck 102. The collector opening 110 is an opening where a bag or other collection vessel may be attached to collect lawn clippings. The mulch plug 112 may be one-piece and may be made of plastic.

The mulch plug 112 may be manufactured by, but not limited to, injection molding, casting, thermoforming, etc. Suitable materials for the manufacture of the mulch plug may include those, which are able to withstand the pressure and temperature excursions of a lawnmower in operation over a period of time. Suitable plastics include, but are not limited to, polypropylene, polypropylene high impact copolymers, high-density polyethylene (HDPE), low-density polyethylene (LDPE), acrylonitrile butadiene styrene (ABS), ultra high molecular weight polyethylene (UHMWPE), polycarbonate (PC), polyoxymethylene (POM), Nylon, or a combination thereof. In some aspects, the plastic is a polypropylene high impact copolymer.

Installing the mulch plug 112 may confine the volume in which the lawn clippings may circulate in the cutting deck 102. As a result, the lawn clippings may be forced to recirculate more in the cutting deck 102 and are cut additional times into smaller, finer pieces.

The mulch plug 112 may include a plurality of ramps extending downward into the cutting deck 102 including a first ramp 118 on the lower plane 104 of the cutting deck 102 and a second ramp 120 positioned further in a cutting blade rotation 140 of the cutting blade 108 from the first ramp 118 on a trailing edge 148 of the mulch plug 112 for deflecting lawn clippings out of the cutting deck 102.

The first ramp 118 may be positioned on the lower plane 104 of the cutting deck 102 between a right rear wheel 124 and a center-line 152 of the lawnmower 100. The second ramp 120 may be positioned on the lower plane 104 of the cutting deck between a left rear wheel 126 and the center-line 152 of the lawnmower 100.

Figure 2:
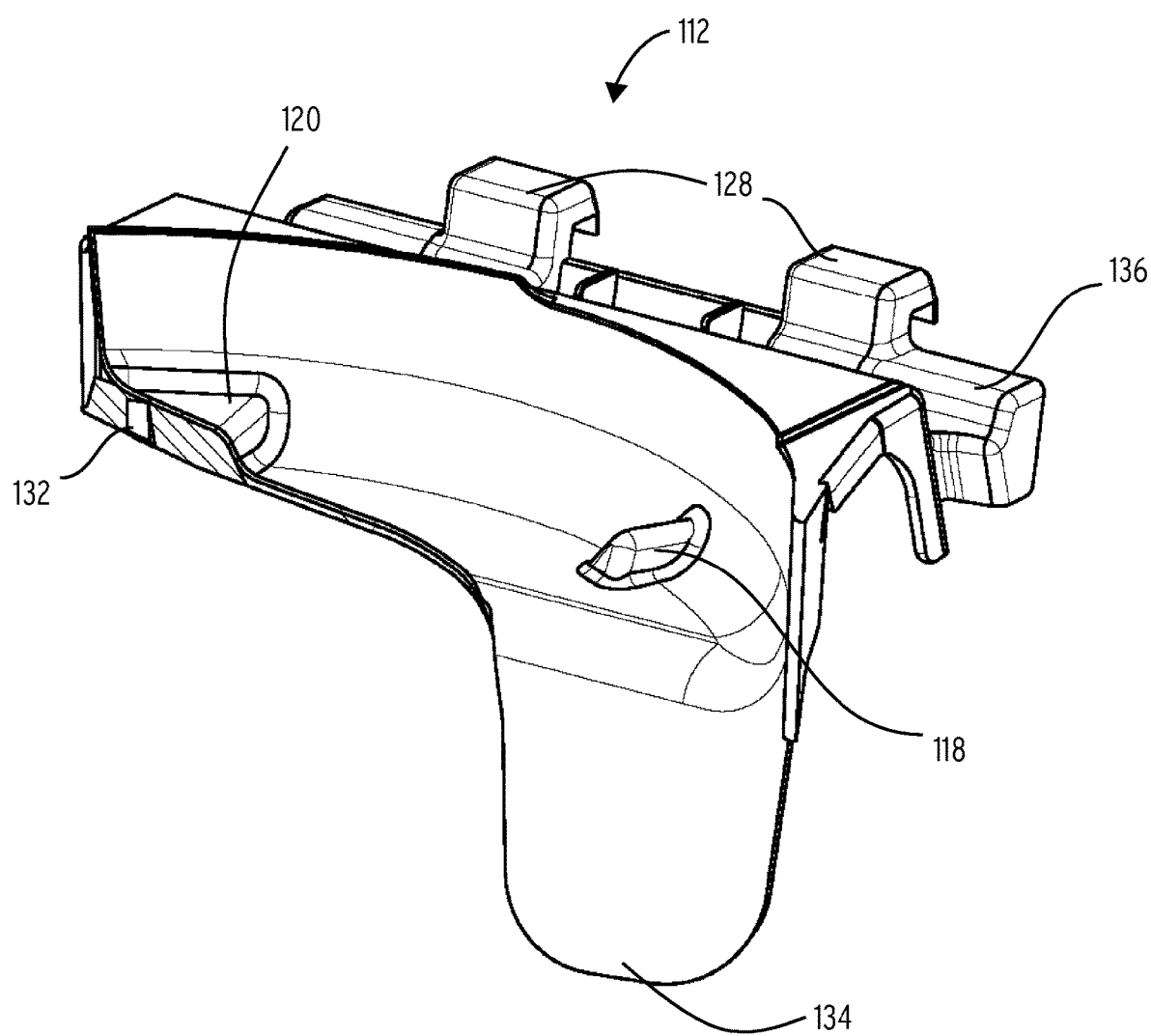
FIG. 2 is a front bottom perspective view of the illustrative mulch plug of FIG. 1 in accordance with one aspect of the present disclosure.
Figure 3:
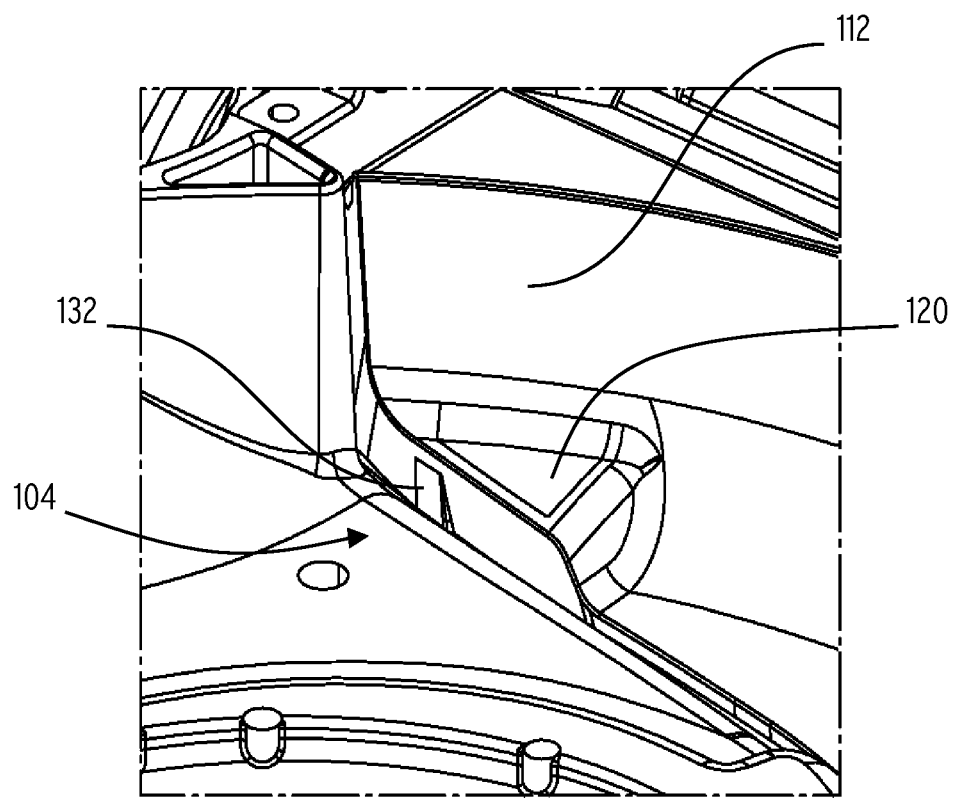
FIG. 3 shows a close-up view of the exemplary lawnmower shown in FIG. 1 at the point of attachment of the illustrative mulch plug on a lower plane in accordance with one aspect of the present disclosure.

FIG. 2 is a front bottom perspective view of the mulch plug 112 of FIG. 1 in accordance with one aspect of the present disclosure. A lower plane attachment 132 and an upper plane attachment 134 may be used to secure the mulch plug 112 to the cutting deck 102. FIG. 3 shows a close-up view of the lawnmower 100 shown in FIG. 1 with the lower plane attachment 132 of the mulch plug 112 on the lower plane 104.

Figure 4:
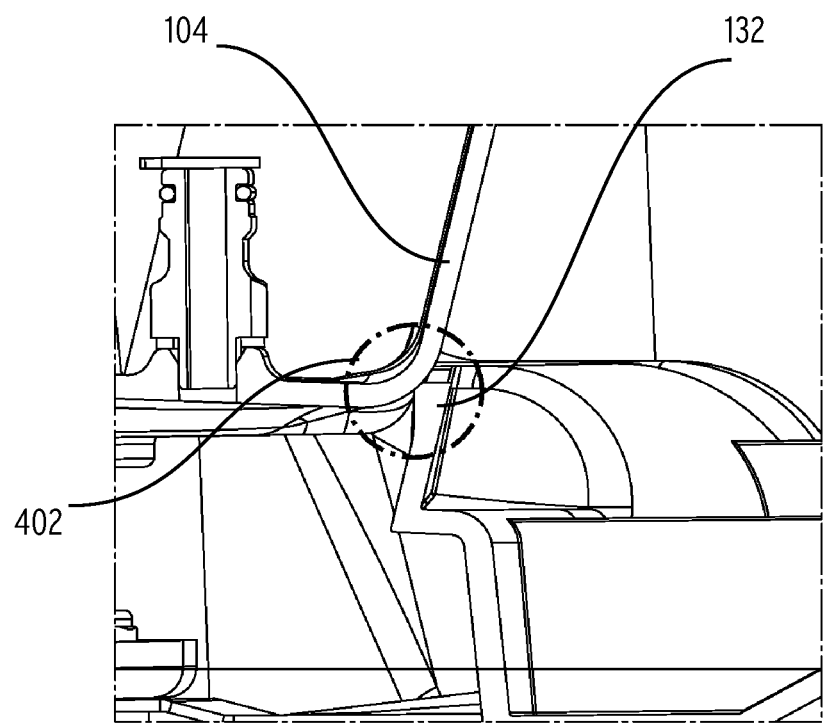
FIG. 4 shows a longitudinal cross-section of the point of attachment of the illustrative mulch plug depicted in FIG. 3 on a lower plane of the lawnmower in accordance with one aspect of the present disclosure.

Now referring to FIG. 4, the mulch plug 112 may be secured to the cutting deck 102 with at a snap-fit to the lower plane 104 of the cutting deck 102. The lower plane attachment 132 may be configured, by its shape, to snap-fit to the lower plane 104 at a snap-fit attachment location 402 independent of any support structures located in the lower plane 104 itself. As used herein, an attachment is configured to "snap-fit" to a given surface or point on the lawnmower if the attachment is able to be pressed into place securely without requiring additional support, fasteners, or tools.

Figure 5:
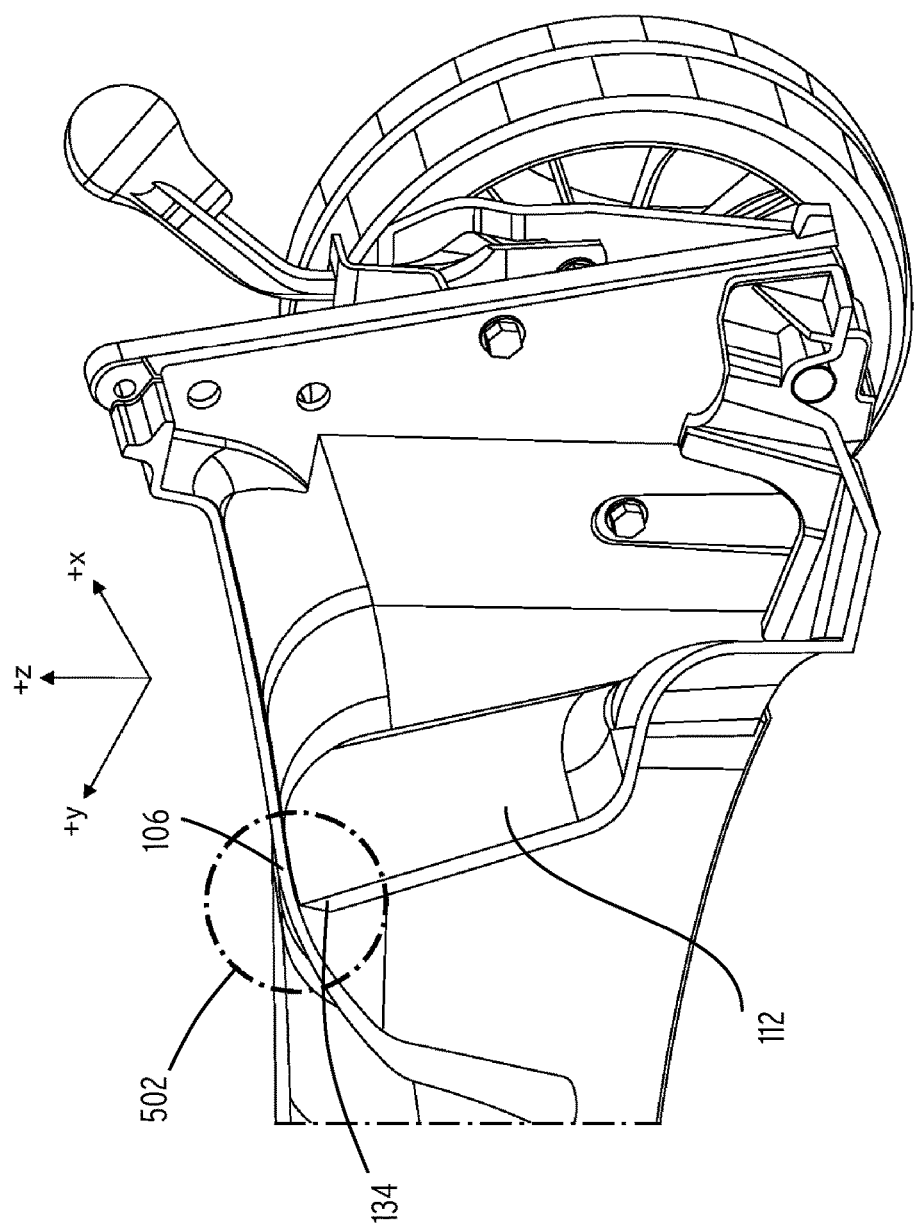
FIG. 5 shows a longitudinal cross-section of the illustrative mulch plug in accordance with one aspect of the present disclosure.

The mulch plug 112 may be further secured to the cutting deck 102 with at an interference-fit to the upper plane 106 of the cutting deck 102. The upper plane attachment 134 of the mulch plug 112 may be configured to interference-fit to the upper plane 106 at an interference-fit attachment location 502, as shown in FIG. 5. The upper plane attachment 134 presents an angle to the upper plane 106, not flush to the surface of the upper plane 106 with the full thickness of the mulch plug 112 at the upper plane attachment 134. As used herein, an "interference-fit" between two surfaces or objects may be one where the two surfaces or objects meet at an interface but they do not snap-fit, fasten, or flush to one another, but one abuts the other in a way that interferes with movement of the two surfaces or objects relative to one another.

The cutting blade 108 may begin to cut the lawn at an initial lawn cutting area 138. The cutting blade rotation 140 is shown in FIG. 1 to depict the rotation path of the cutting blade 108. As the lawn is cut at the initial lawn cutting area 138, lawn clippings may begin to accumulate in the cutting deck 102 along the cutting blade rotation 140. Lawn clippings may be accumulating in the cutting deck 102 between the initial lawn cutting area 138 and the upper plane attachment 134 of the mulch plug 112. The accumulation may be greater in the cutting blade rotation 140 at the upper plane attachment 134 than the initial lawn cutting area 138. As the lawn clippings are accumulating, the cutting volume of the cutting deck 102 may decrease. The decrease in cutting volume also may cause increased pressure in the cutting deck 102.

The accumulation of lawn clippings may be reduced as a portion of the lawn clippings continue in the cutting blade rotation 140 and contact the first ramp 118 of the mulch plug 112. The portion of the lawn clippings, which contact the first ramp 118, may be deflected out of the cutting deck 102 and distributed to the ground. Additionally, the accumulation of lawn clippings may be reduced as a portion of the lawn clippings continue in the cutting blade rotation 140 and contact the second ramp 120. The portion of the lawn clippings, which contact the second ramp 120, may also be deflected out of the cutting deck 102 and distributed to the ground.

The portion of lawn clippings that may be deflected out of the cutting deck 102 by contacting the first ramp 118 and the second ramp 120 decreases the amount of lawn clippings that discharge in a lawn clippings discharge area 114. The lawn clippings may be accumulated at the highest volume after the second ramp 120 and along the upper plane 106. As a result of the reduced volume and increased pressure in the cutting deck, the grass may be forced out of the cutting deck 102 at the lawn clippings discharge area 114. The removal of a portion of lawn clippings, which were deflected out of the cutting deck after contacting the first ramp 118 and the second ramp 120, may reduce the volume of lawn clippings forced out the cutting deck 102 at the lawn clippings discharge area 114. As a result, the lawn clippings may be evenly distributed to the ground. The even distribution of lawn clippings may help to prevent the clumping of lawn clippings or lines of lawn clippings in the path of the rear wheels. For example, if a high volume of lawn clippings are discharged by the cutting deck 102 at the lawn clippings discharge area 114, then the left rear wheel 126 may roll over the lawn clippings during mowing and leave a stripe of lawn clippings.

Figure 6:
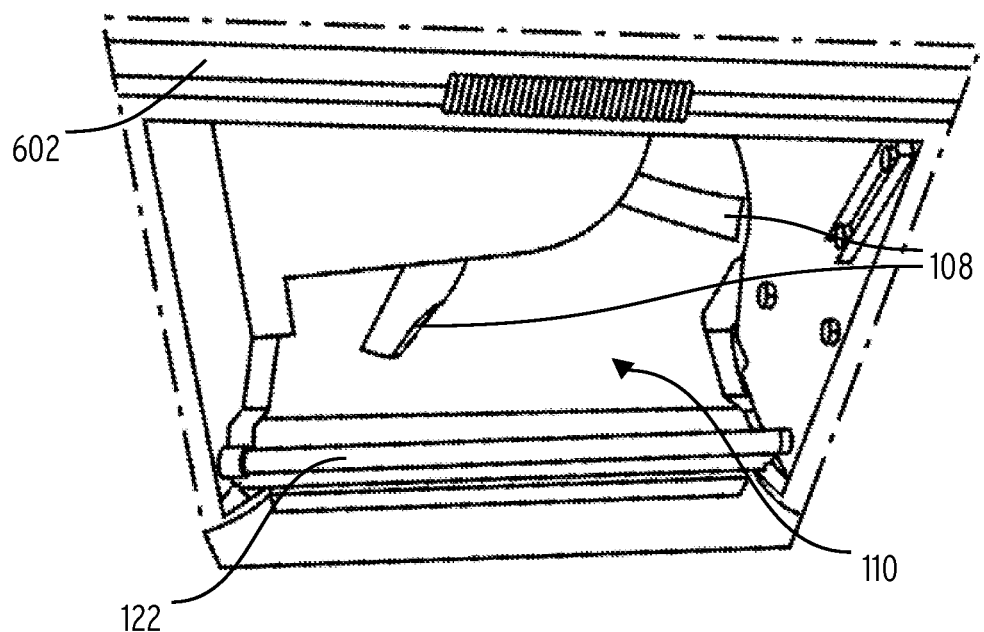
FIG. 6 shows a rear perspective view of a portion of the exemplary lawnmower for use with the illustrative mulch plug without the mulch plug installed in accordance with one aspects of the present disclosure.

In FIG. 6, a rear discharge door 602 has been raised and moved away from the collector opening 110. A rear axle 122 is shown without the rear axle cover 136 installed. The rear axle 122 connects the pair of rear wheels 150 to each other. The cutting blade 108 can be seen through the collector opening 110 with the mulch plug 112 removed and the rear discharge door 602 raised.

Figure 7:
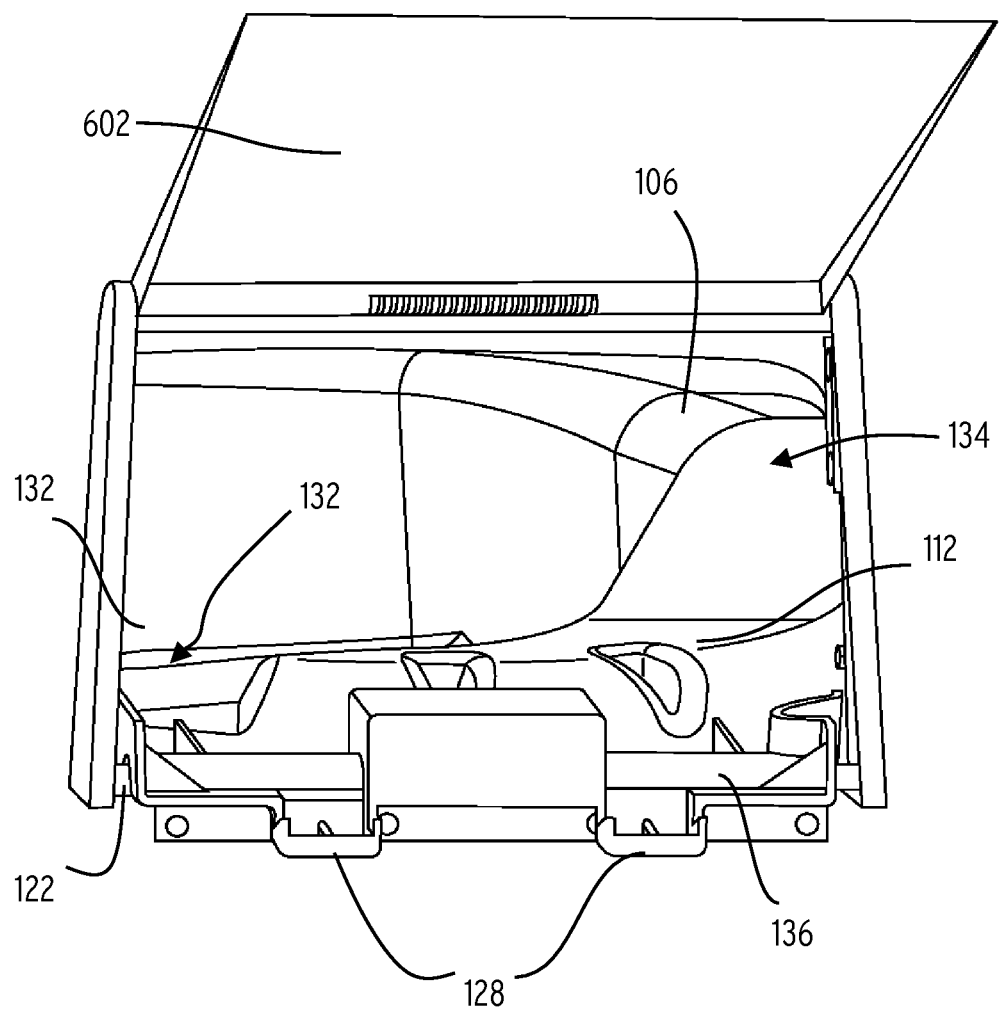
FIG. 7 shows a rear perspective view of the illustrative mulch plug installed in the exemplary lawnmower depicting the points of attachment to an upper plane and a lower plane in accordance with one aspect of the present disclosure.

FIG. 7 shows the mulch plug 112 installed. Two tabs 128 may extend from the mulch plug 112 (e.g., from the rear). As shown in FIG. 7, the mulch plug 112 has up to four points of attachment to the lawnmower 100 itself: upper plane attachment 134, lower plane attachment 132, one or more tabs 128, and/or rear axle cover 136. In some aspects, the mulch plug 112 comprises an upper plane attachment 134 and a lower plane attachment 132. In some aspects, the mulch plug 112 may include an upper plane attachment 134, lower plane attachment 132, and rear axle rear axle cover 136. In some aspects, the mulch plug 112 may include one or more tabs 128. In some aspects, the mulch plug 112 may include one or more tabs 128 and rear axle cover 136. In some aspects, the mulch plug 112 may include an upper plane attachment 134, lower plane attachment 132, one or more tabs 128, and rear axle cover 136.

Figure 8:
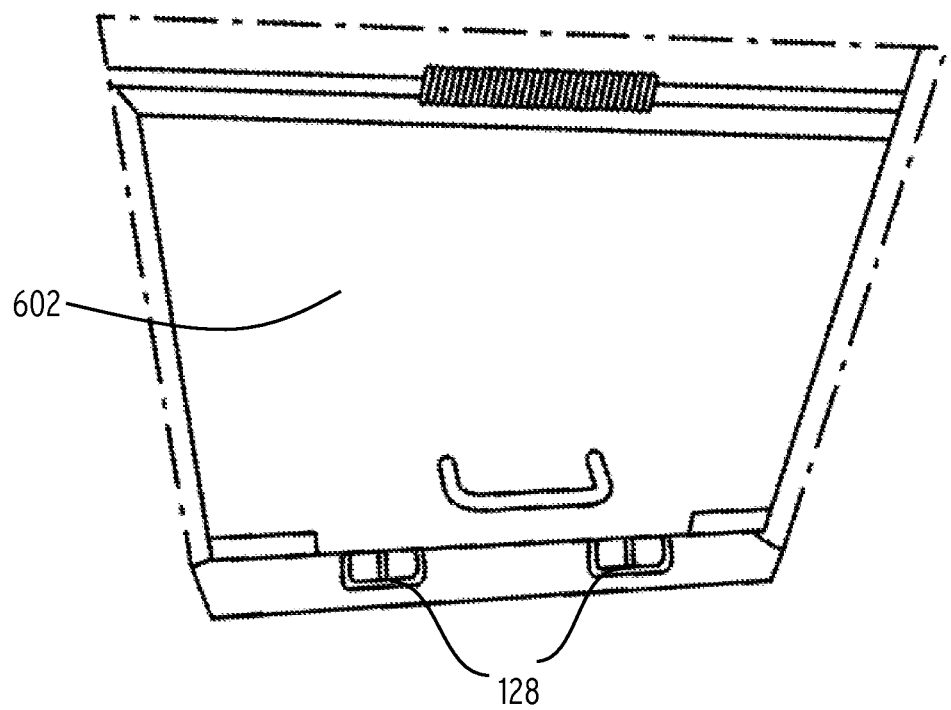
FIG. 8 shows the portion of the exemplary lawnmower of FIG. 6 with the illustrative mulch plug installed and the rear discharge door in place in accordance with one aspect of the present disclosure.

FIG. 8 shows a portion of the lawnmower 100 of FIG. 6 with the rear discharge door 602 lowered to the collector opening 110 and engaged with the tabs 128. The rear discharge door 602 may be moved so as to attach a bag or other collection vessel to collect lawn clippings. When the rear discharge door 602 is raised, lawn clippings and debris striking it may be deflected into the bag or collection vessel.

With the mulch plug 112 securely attached to the cutting deck 102 of the lawnmower 100, the movement of the installed mulch plug 112 during lawnmower 100 operation may be minimized. As a result, the distribution of the lawn clippings may be even and consistent.

In an alternative embodiment, a lawnmower 100 may utilize a swing blade system 144. As shown in FIG. 1, the swing blade system 144 may include more than one cutting blade 108 attached to a blade holder 146. The swing blade system 144 may be attached to a crankshaft 130.

The swing blade system 144 may allow the cutting blade 108 to rotate if it strikes an object such as a rock or stump. The rotation of the cutting blade 108 after striking an object may prevent the crankshaft 130 from being damaged since the resulting force of the strike is not directly transferred to the crankshaft 130. The swing blade system 144 may be used when cutting a lawn at a shorter height since there is a higher potential for striking objects.

In the alternative embodiment, the mulch plug 112 may be secured to a lower plane 104 of the cutting deck 102 and an upper plane 106 of the cutting deck 102. Similar to the first embodiment, the mulch plug may be secured with a snap-fit or interference-fit to the cutting deck 102.

Additional details of the alternative embodiment may be similar to the first embodiment. For example, as shown in FIG. 1, the lawnmower 100 may include a cutting deck 102 with one or more depth planes, including at least a lower plane 104 and an upper plane 106. The cutting deck 102 may be supported by a pair of front wheels 142 and a pair of rear wheels 150. A mulch plug 112 may be configured to block a collector opening 110 in the cutting deck 102. The collector opening 110 may be an opening where a bag or other collection vessel may be attached to collect lawn clippings.

Similar to the first embodiment as shown in FIG. 1, the mulch plug 112 may include a plurality of ramps having a first ramp 118 on the lower plane 104 of the cutting deck 102 that extends downward from the mulch plug 112 and a second ramp 120 positioned further in a cutting blade rotation 140 of the cutting blade 108 from the first ramp 118 on a trailing edge 148 of the mulch plug 112 for deflecting lawn clippings out of the cutting deck 102.

In an alternative embodiment, a lawnmower 100 may utilize a swing blade system 144 as described in the first alternative embodiment, and a mulch plug 112 that attaches to a lower plane 104, an upper plane 106 of a cutting deck 102, and snap-fits over a rear axle 122 to block a collector opening 110. The rear axle 122 and snap-fit attachment of the rear axle cover 136 is shown in FIG. 1, FIG. 7, and FIG. 8.

Additional details of the alternative embodiment may be similar to the first embodiment. For example, as shown in FIG. 1, the lawnmower 100 may include a cutting deck 102 with one or more depth planes, including at least a lower plane 104 and an upper plane 106. The cutting deck 102 may be supported by a pair of front wheels 142 and a pair of rear wheels 150. A mulch plug 112 may be configured to block a collector opening 110 in the cutting deck 102.

Similar to the first embodiment as shown in FIG. 1, the mulch plug 112 may include a plurality of ramps extending downward form the much plug including a first ramp 118 on the lower plane 104 of the cutting deck 102 and a second ramp 120 positioned further in a cutting blade rotation 140 of the cutting blade 108 from the first ramp 118 on a trailing edge 148 of the mulch plug 112 for deflecting lawn clippings out of the cutting deck 102.

It will also be understood that the lawnmower described above can provide a more even distribution of lawn clippings by utilizing a mulch plug with a plurality of ramps that is securely attached to a lower plane and an upper plane of a cutting deck.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated.

Embodiments are also intended to include or otherwise cover methods of using and methods of manufacturing the lawnmower and mulch plug with ramps. The methods of manufacturing include or otherwise cover processors and computer programs implemented by processors used to design various elements of the lawnmower and mulch plug with ramps disclosed above. For example, embodiments are intended to cover processors and computer programs used to design or manufacture the various components of the lawnmower and mulch plug with ramps used for various manufacturing processes.

The scope of the invention is, of course, not limited to the examples or embodiments set forth herein, but may be employed in any number of applications and equivalent devices by those of ordinary skill in the art. Rather it is hereby intended the scope of the invention be defined by the claims appended hereto.

What is claimed is:

1. A lawnmower comprising:
    a cutting deck with two or more depth planes, the two or more depth planes including a lower plane and an upper plane supported by a pair of front and rear wheels;
    at least one cutting blade;
    a collector opening; and
    a mulch plug with a plurality of ramps, wherein the mulch plug snap-fits to the lower plane of the cutting deck at a lower plane attachment portion and interference-fits to the upper plane of the cutting deck blocking the collector opening, wherein one of the plurality of ramps extends from a mulch plug edge at the lower plane attachment portion.

2. The lawnmower of claim 1, wherein the plurality of ramps of the mulch plug comprise a first ramp on the lower plane of the cutting deck extending downward from the mulch plug deflecting lawn clippings out of the cutting deck.

3. The lawnmower of claim 1, wherein the plurality of ramps of the mulch plug comprise a second ramp on the lower plane of the cutting deck extending downward from the mulch plug deflecting lawn clippings out of the cutting deck.

4. The lawnmower of claim 1, wherein the mulch plug is a one-piece molded plastic.

5. The lawnmower of claim 2, wherein the first ramp is positioned on the lower plane of the cutting deck between a right rear wheel and a center-line of the lawnmower.

6. The lawnmower of claim 3, wherein the second ramp is positioned on the lower plane of the cutting deck between a left rear wheel and the center-line of the lawnmower.

7. The lawnmower of claim 3, wherein the second ramp is positioned further in the rotation of the cutting blades from the first ramp on a trailing edge of the mulch plug.

8. A lawnmower comprising:
    a cutting deck with two or more depth planes, the two or more depth planes including a lower plane and an upper plane supported by a pair of front and rear wheels;
    a swing blade system;
    a collector opening; and
    a mulch plug with a plurality of ramps, wherein the mulch plug is attached to the lower plane and the upper plane of the cutting deck blocking the collector opening, wherein one of the plurality of ramps extends from a mulch plug edge at a lower plane attachment portion of the mulch plug.

9. The lawnmower of claim 8, wherein the plurality of ramps of the mulch plug comprise a first ramp on the lower plane of the cutting deck between a right rear wheel and a center-line of the lawnmower extending downward from the mulch plug for deflect lawn clippings out of the cutting deck.

10. The lawnmower of claim 8, wherein the plurality of ramps of the mulch plug comprise a second ramp on the lower plane of the cutting deck extending downward from the mulch plug and positioned further in the rotation of the swing blade system from the first ramp on a trailing edge of the mulch plug for deflection of lawn clippings out of the cutting deck.

11. The lawnmower of claim 10, wherein the second ramp is positioned on the lower plane of the cutting deck between a left rear wheel and a center-line of the lawnmower.

12. The lawnmower of claim 8, wherein the mulch plug is a one-piece molded plastic.

13. The lawnmower of claim 8, wherein the swing blade system comprises a blade holder securing a plurality of cutting blades attached to a crankshaft.

14. The lawnmower of claim 13, wherein the plurality of cutting blades rotate after striking an object protecting the crankshaft.

* * * * *